US012409010B2

(12) United States Patent
Snyder (10) Patent No.: US 12,409,010 B2
(45) Date of Patent: Sep. 9, 2025

(54) DENTAL BUR

(71) Applicant: Todd C. Snyder, Laguna Niguel, CA (US)

(72) Inventor: Todd C. Snyder, Laguna Niguel, CA (US)

(73) Assignee: Todd C. Snyder, Laguna Niguel, CA (US)

( * ) Notice: Subject to any disclaimer, the term of this patent is extended or adjusted under 35 U.S.C. 154(b) by 115 days.

(21) Appl. No.: 17/369,330

(22) Filed: Jul. 7, 2021

(65) Prior Publication Data

US 2023/0008344 A1  Jan. 12, 2023

(51) Int. Cl.
*A61C 5/42* (2017.01)

(52) U.S. Cl.
CPC ............ *A61C 5/42* (2017.02); *A61C 2201/00* (2013.01)

(58) Field of Classification Search
CPC .. A61C 5/42; A61C 3/02; A61C 3/025; A61C 3/06; A61C 2201/00
See application file for complete search history.

(56) References Cited

U.S. PATENT DOCUMENTS

| | | | |
|---|---|---|---|
| 2,280,927 A * | 4/1942 | Phillips | A61C 3/02 433/225 |
| 2,807,264 A * | 9/1957 | Tuck | A61B 17/1673 606/81 |
| 2,902,763 A * | 9/1959 | Wolfgang | A61C 3/02 433/165 |
| 4,345,899 A * | 8/1982 | Vlock | A61C 3/02 433/165 |
| 4,684,346 A * | 8/1987 | Martin | A61C 3/02 433/102 |
| 4,830,615 A * | 5/1989 | Goldstein | A61C 3/06 433/229 |
| 5,816,807 A * | 10/1998 | Matsutani | A61C 3/02 433/165 |
| 6,267,595 B1 * | 7/2001 | Gratz | A61C 3/02 433/165 |
| 6,511,322 B1 | 1/2003 | Kometas | |
| 6,676,410 B2 * | 1/2004 | Beppu | A61C 3/02 433/166 |

(Continued)

OTHER PUBLICATIONS

"Catalog of Supplier Dental Burs"—Sep. 17, 2024.

*Primary Examiner* — Eric J Rosen
*Assistant Examiner* — Hao D Mai
(74) *Attorney, Agent, or Firm* — Barnes & Thornburg LLP (57) ABSTRACT

A dental bur for removing precise portions of a tooth includes a shank and a head. The shank includes first and second end, an attachment section located adjacent the first end, and a guide section located between the attachment section and the second end. The attachment section is configured to be inserted into and rotationally driven by a high-speed rotary device. The guide section includes at least one portion having a first width measured in a transverse direction of the shank and a second portion having a second width measured in the transverse direction. The first width being different than the second width. The head is arranged on the second end of the shank and includes a tip located opposite the shank. The tip has a rounded portion configured to remove portions of the tooth, and the head is entirely coated in an abrasive diamond material.

11 Claims, 7 Drawing Sheets

(56) References Cited

U.S. PATENT DOCUMENTS

| | | | |
|---|---|---|---|
| 7,021,933 B2 | 4/2006 | Caldwell | |
| 7,300,341 B2 | 11/2007 | Tesuka | |
| 7,700,195 B2 * | 4/2010 | Airoldi | B26D 7/086 |
| | | | 427/249.1 |
| 10,064,702 B2 | 9/2018 | Wiand | |
| 2001/0004518 A1 * | 6/2001 | Murai | A61C 5/42 |
| | | | 433/102 |
| 2005/0106532 A1 * | 5/2005 | Deutsch | A61C 5/44 |
| | | | 433/102 |
| 2005/0130103 A1 * | 6/2005 | Caldwell | A61B 17/1673 |
| | | | 433/165 |
| 2006/0008766 A1 * | 1/2006 | Fischer | B23D 73/00 |
| | | | 433/102 |
| 2006/0105293 A1 * | 5/2006 | Funato | A61C 3/02 |
| | | | 433/165 |
| 2007/0202461 A1 * | 8/2007 | Wang | A61C 3/02 |
| | | | 433/165 |
| 2010/0173263 A1 * | 7/2010 | Tetsuka | A61C 3/02 |
| | | | 433/165 |
| 2010/0266984 A1 * | 10/2010 | Jung | A61B 17/1688 |
| | | | 433/166 |
| 2011/0195377 A1 * | 8/2011 | Sun | A61C 3/02 |
| | | | 433/165 |
| 2017/0065380 A1 * | 3/2017 | Leeson | G05B 19/4099 |

* cited by examiner

DENTAL BUR

BACKGROUND

The present disclosure relates to dental tools. More particularly, the present disclosure relates to dental burs for high-speed dental drills.

SUMMARY

According to the present disclosure, a dental bur for removing precise portions of a tooth includes a shank and a head. The shank has a first terminal end, a second terminal end located opposite the first terminal end in a longitudinal direction of the shank, an attachment section located adjacent the first terminal end, and a guide section located between the attachment section and the second terminal end, the attachment section being configured to inserted into and rotationally driven by a high-speed rotary device, the guide section including at least one portion having a first width measured in a transverse direction of the shank and a second portion having a second width measured in the transverse direction, and the first width being different than the second width. The head is arranged on the second terminal end of the shank and including a tip located opposite the shank, the tip having at least one rounded portion configured to remove portions of the tooth, and the head being entirely coated in an abrasive diamond material.

In at least some embodiments, the guide section includes an inner end located adjacent the attachment section and an outer end located adjacent the head, the at least one portion having the first width is located at the inner end of the guide section, the second portion having the second width is located at the outer end of the guide section, and the first width is greater than the second width.

In at least some embodiments, the guide section has a constant first taper from the at least one portion having the first width to the second portion having the second width so as to form a frustum-shape.

In at least some embodiments, the at least one rounded portion of the tip has a semi-spherical shape.

In at least some embodiments, the head includes an inner terminal end located adjacent the second terminal end of the shank and a main body portion located between the inner terminal end and the tip, and the inner terminal end has a third width that is equal to the second width of the second portion of the guide section of the shank.

In at least some embodiments, an inner end of the tip located adjacent the main body portion of the head has a fourth width that is less than the third width.

In at least some embodiments, the main body portion of the head has a constant second taper from the inner terminal end having the third width to the inner end of the tip having the fourth width so as to form a frustum-shape, and a taper angle of the second taper is equal to a taper angle of the first taper of the guide section of the shank.

In at least some embodiments, the guide section of the shank and the main body portion of the head are generally cylindrical such that the first, second, third, and fourth widths are diameters of the generally cylindrical shank and head.

In at least some embodiments, the head includes an inner terminal end located adjacent the second terminal end of the shank, a main body portion located between the inner terminal end and the tip, and an inner end of the tip located adjacent the main body portion of the head, wherein the at least one rounded portion of the tip is an annular rounded ridge that extends around the tip at the inner end of the tip, and wherein a distal end of the tip located opposite the inner end of the tip is an annular flat surface connected to the annular rounded ridge.

In at least some embodiments, the guide section includes an inner end located adjacent the attachment section, an outer end located adjacent the head, and an intermediate section located between the inner end and the outer end, the at least one portion having the first width is located at the inner end of the guide section, the second portion having the second width is located at the outer end of the guide section, a third portion of the guide section is located between the at least one portion and the second portion within the intermediate section and has a third width measured in the transverse direction, and the first width and the second width are greater than the third width such that the guide section has an hourglass shape.

In at least some embodiments, the guide section of the shank is generally cylindrical such that the first, second, and third widths are diameters of the generally cylindrical shank.

According to another aspect of the present disclosure, a high-speed dental drill includes a drill head, a bur mount, a motor, and a dental bur. The bur mount is arranged within the drill head and configured to rotate at high speeds, and the motor is for rotating the bur mount. The dental bur is arranged within the bur mount and includes a shank and a head.

The shank has a first terminal end, a second terminal end located opposite the first terminal end in a longitudinal direction of the shank, an attachment section located adjacent the first terminal end, and a guide section located between the attachment section and the second terminal end, the attachment section being configured to inserted into and rotationally driven by a high-speed rotary device, the guide section including at least one portion having a first width measured in a transverse direction of the shank and a second portion having a second width measured in the transverse direction, and the first width being different than the second width.

The head is arranged on the second terminal end of the shank and including a tip located opposite the shank, the tip having at least one rounded portion configured to remove portions of the tooth, and the head being entirely coated in an abrasive diamond material.

In at least some embodiments, the guide section includes an inner end located adjacent the attachment section and an outer end located adjacent the head, the at least one portion having the first width is located at the inner end of the guide section, the second portion having the second width is located at the outer end of the guide section, and the first width is greater than the second width.

In at least some embodiments, the guide section has a constant first taper from the at least one portion having the first width to the second portion having the second width so as to form a frustum-shape.

In at least some embodiments, the at least one rounded portion of the tip has a semi-spherical shape.

In at least some embodiments, the head includes an inner terminal end located adjacent the second terminal end of the shank and a main body portion located between the inner terminal end and the tip, and the inner terminal end has a third width that is equal to the second width of the second portion of the guide section of the shank.

In at least some embodiments, the main body portion of the head has a constant second taper from the inner terminal end having the third width to the inner end of the tip having the fourth width so as to form a frustum-shape, and a taper angle of the second taper is equal to a taper angle of the first taper of the guide section of the shank.

In at least some embodiments, the head includes an inner terminal end located adjacent the second terminal end of the shank, a main body portion located between the inner terminal end and the tip, and an inner end of the tip located adjacent the main body portion of the head, wherein the at least one rounded portion of the tip is an annular rounded ridge that extends around the tip at the inner end of the tip, and wherein a distal end of the tip located opposite the inner end of the tip is an annular flat surface connected to the annular rounded ridge In at least some embodiments, the guide section includes an inner end located adjacent the attachment section, an outer end located adjacent the head, and an intermediate section located between the inner end and the outer end, the at least one portion having the first width is located at the inner end of the guide section, the second portion having the second width is located at the outer end of the guide section, a third portion of the guide section is located between the at least one portion and the second portion within the intermediate section and has a third width measured in the transverse direction, and the first width and the second width are greater than the third width such that the guide section has an hourglass shape.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 9:
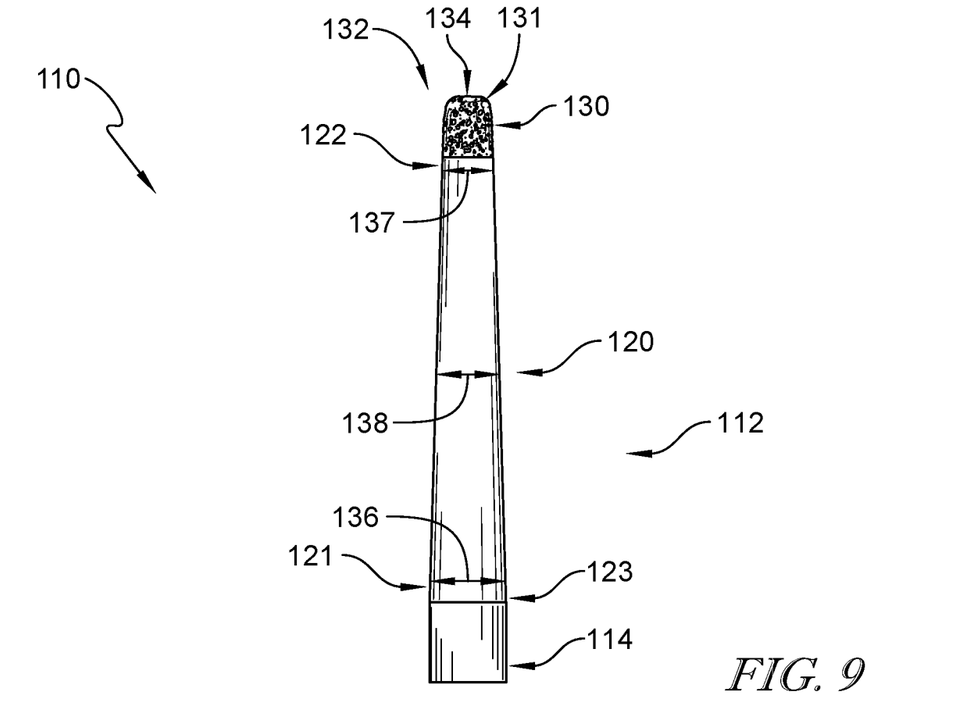
FIG. 9 is a front elevation view of a dental bur according to another embodiment of the present disclosure, showing that the dental bur includes a shank and a head having an abrasive diamond material applied thereto, the head having a chamfer shape, and the shank including a guide section having a constant taper and not having an abrasive material applied thereto so as to allow for precision application of the head to a tooth for minimal and precise tooth material removal without the guide section removing tooth material when coming into contact with adjacent teeth.
Figure 10:
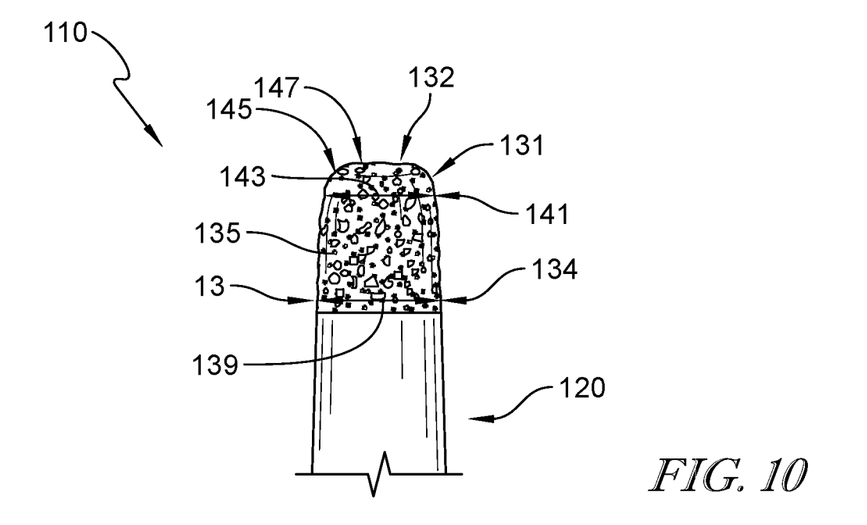
FIG. 10 is a is a front elevation view of the head of the dental bur of FIG. 9, showing the tip having a chamfer shape, and showing that the head includes an inner terminal end located adjacent a second terminal end of the shank and a main body portion located between the inner terminal end and the tip, and suggesting that the inner terminal end has a width that is equal to the width of the second terminal end of the shank.
Figure 11:
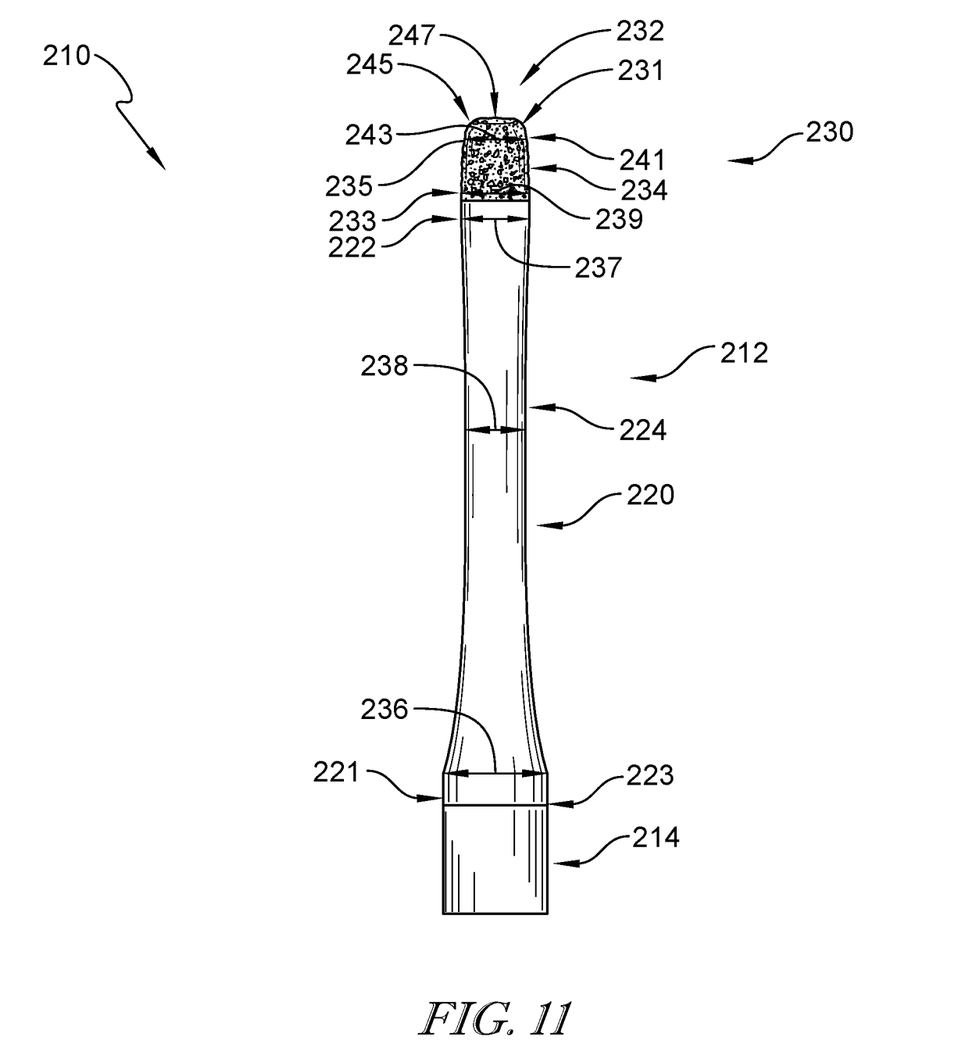
FIG. 11 is a front elevation view of a dental bur according to another embodiment of the present disclosure, showing that the dental bur includes a shank and a head having an abrasive diamond material applied thereto, the head having a chamfer shape, and the shank including a guide section having an hourglass shape and not having an abrasive material applied thereto so as to allow for precision application of the head to a tooth for minimal and precise tooth material removal without the guide section removing tooth material when coming into contact with adjacent teeth.
Figure 12:
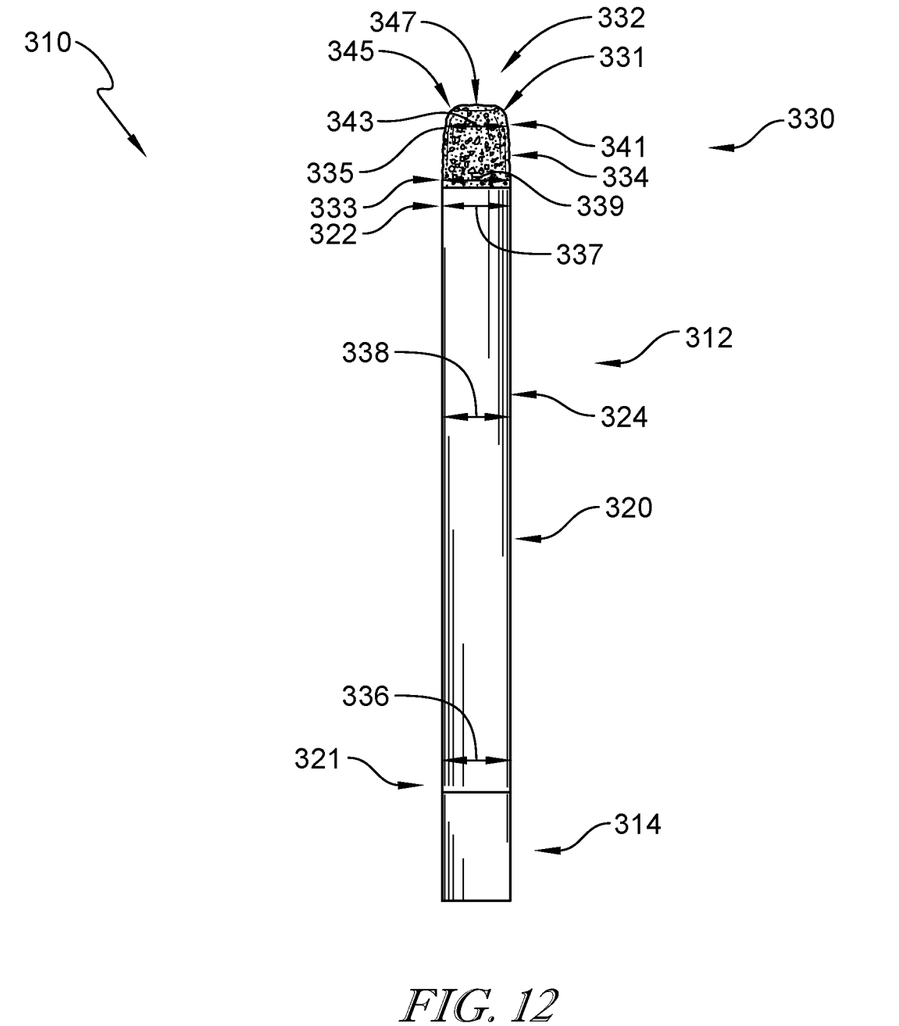
FIG. 12 is a front elevation view of a dental bur according to another embodiment of the present disclosure, showing that the dental bur includes a shank and a head having an abrasive diamond material applied thereto, the head having a chamfer shape, and the shank including a guide section having a straight, cylindrical shape and not having an abrasive material applied thereto so as to allow for precision application of the head to a tooth for minimal and precise tooth material removal without the guide section removing tooth material when coming into contact with adjacent teeth.

A first embodiment of a dental bur 10 in accordance with the present disclosure is shown in FIGS. 1-8. In one example, the dental bur 10 includes a shank 12 having an attachment section 14 and a guide section 20, and a head 30 arranged on a terminal end 18 of the shank 12. The head 30 of the dental bur 10 includes a tip 32 having at least one rounded portion configured to precisely remove portions of a tooth during preparation of a tooth or multiple teeth for application of a crown, veneers, or similar procedure without damaging adjacent teeth or restoration. In the illustrative embodiment, the head 30 is entirely coated in an abrasive diamond material 35 which is capable of removing portions of an outer surface of the tooth when the bur 10 is rotated at high-speeds when arranged within a high-speed drill 80. The shank 12, however, is not coated in any type of abrasive material. This allows for greater precision in the tooth tissue removal due to the shank 12 not being able to remove any tooth tissue that it may accidentally come into contact with when a user is focusing on particular areas of a tooth with the head 30 of the bur 10. A second embodiment of a dental bur 110 according to the present disclosure is shown in FIGS. 9 and 10. Another embodiment of a dental bur 210 according to the present disclosure is shown in FIG. 11. Another embodiment of a dental bur 310 according to the present disclosure is shown in FIG. 12.

Figure 1:
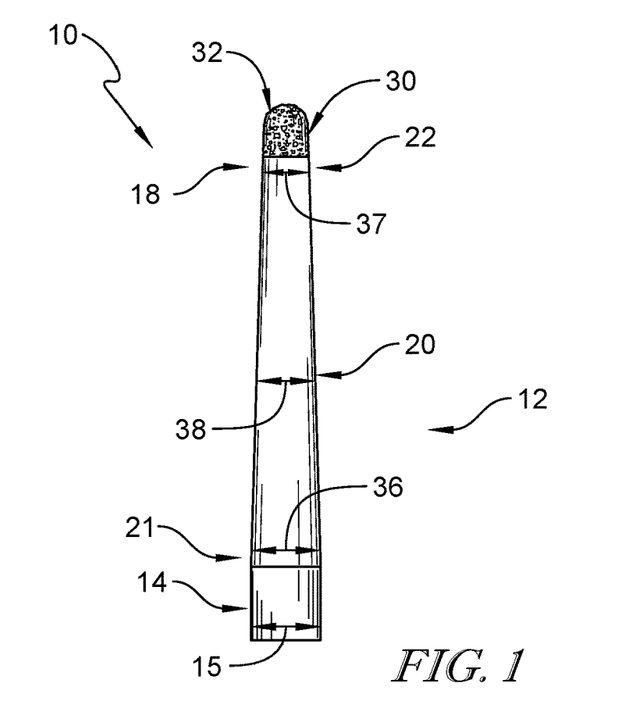
FIG. 1 is a front elevation view of a dental bur according to the present disclosure, showing that the dental bur includes a shank and a head having an abrasive diamond material applied thereto, the head having a semi-spherical shape, and the shank including a guide section having a constant taper and not having an abrasive material applied thereto so as to allow for precision application of the head to a tooth for minimal and precise tooth material removal without the guide section removing tooth material when coming into contact with adjacent teeth.
Figure 2:
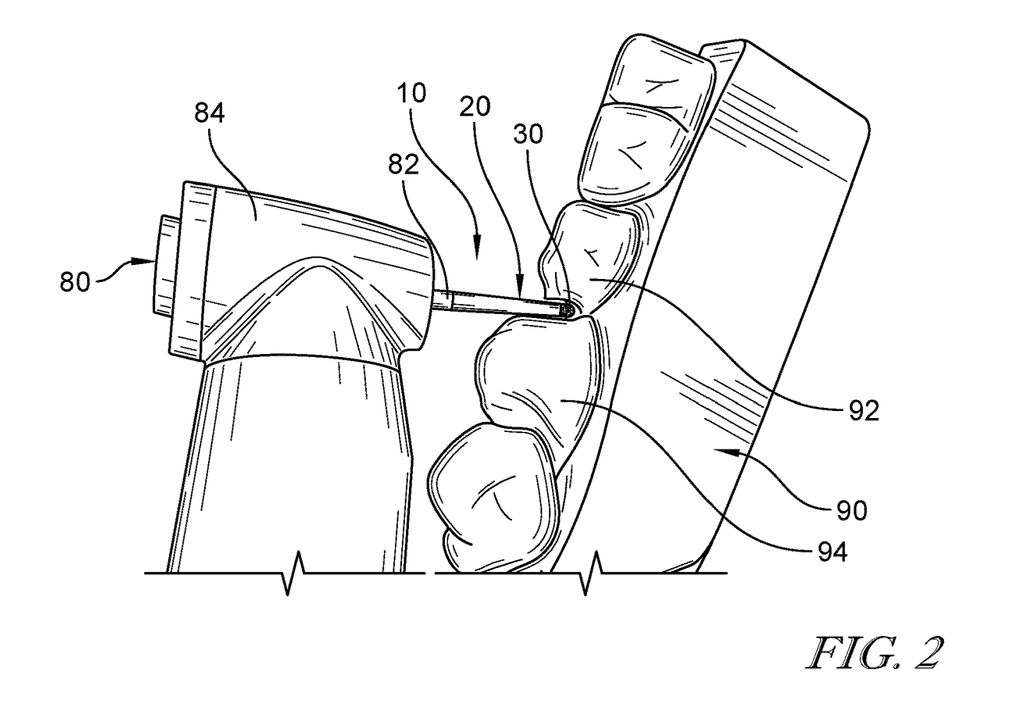
FIG. 2 is a perspective view of the dental bur of FIG. 1, showing the dental bur attached to a dental drill including a head having a bur mount, and showing the dental bur inserted into a lower area of a space between two adjacent teeth in order to precisely remove tooth material.
Figure 3:
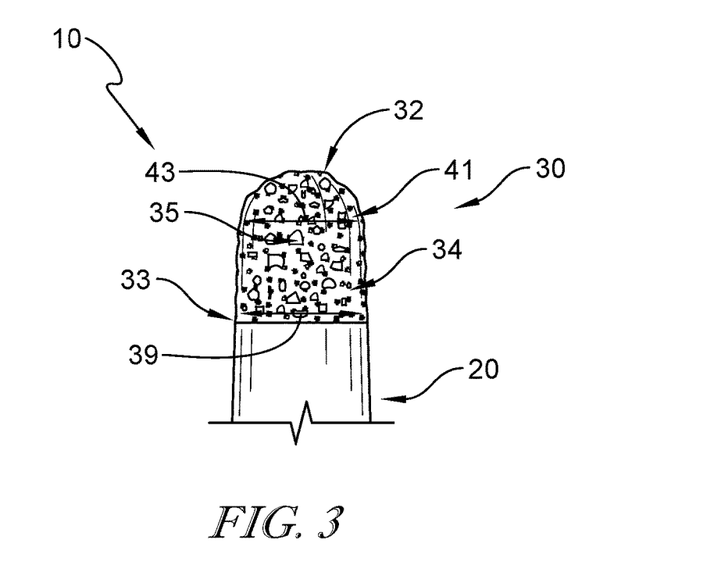
FIG. 3 is a is a front elevation view of the head of the dental bur of FIG. 1, showing the tip having a semi-spherical shape, and showing that the head includes an inner terminal end located adjacent a second terminal end of the shank and a main body portion located between the inner terminal end and the tip, and suggesting that the inner terminal end has a width that is equal to the width of the second terminal end of the shank.
Figure 8:
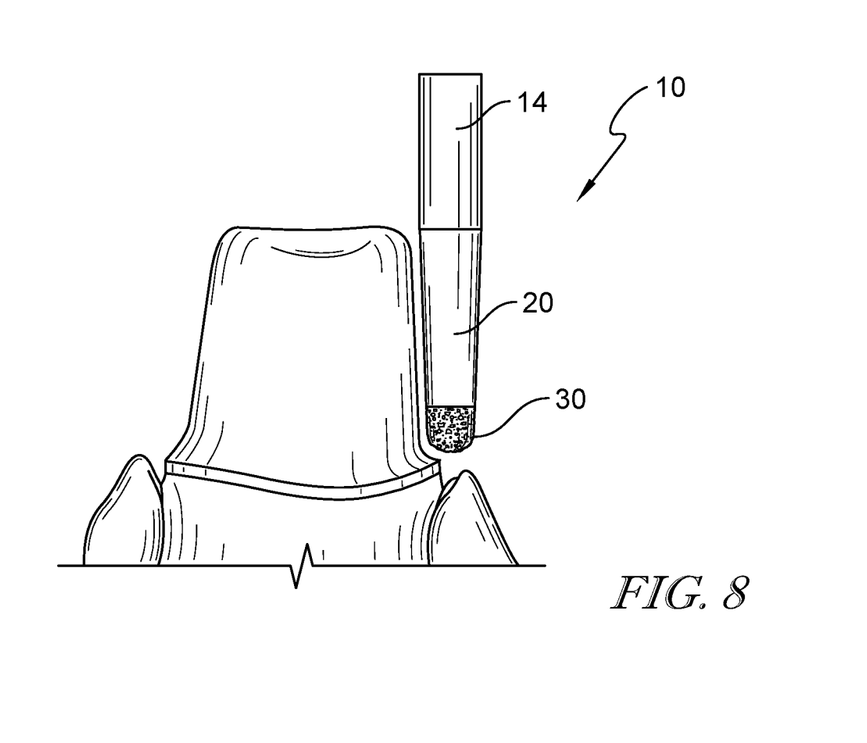
FIG. 8 is a front elevation view of the dental bur of FIG. 1, showing the dental bur inserted into a lower area of a space between two adjacent teeth in order to precisely remove tooth material.

In the illustrative embodiment, the dental bur 10 of the present disclosure includes the shank 12 and the head 30, as shown in FIGS. 1-8 and in greater detail in FIGS. 1, 3 and 8. The shank 12 of the dental bur 10 may be formed from metallic materials and is configured to be inserted into and arranged within a hand-held dental drill 80 such that a user may perform dental procedures on a patient's teeth using the dental bur 10, in particular the diamond-coated head 30 of the dental bur 10. In the illustrative embodiment, the shank 12 is shaped as a cylinder such that the dental bur 10 can be rotationally driven by the dental drill 80 at very high speeds without any lateral forces acting on the drill 80 and bur 10.

Figure 4:
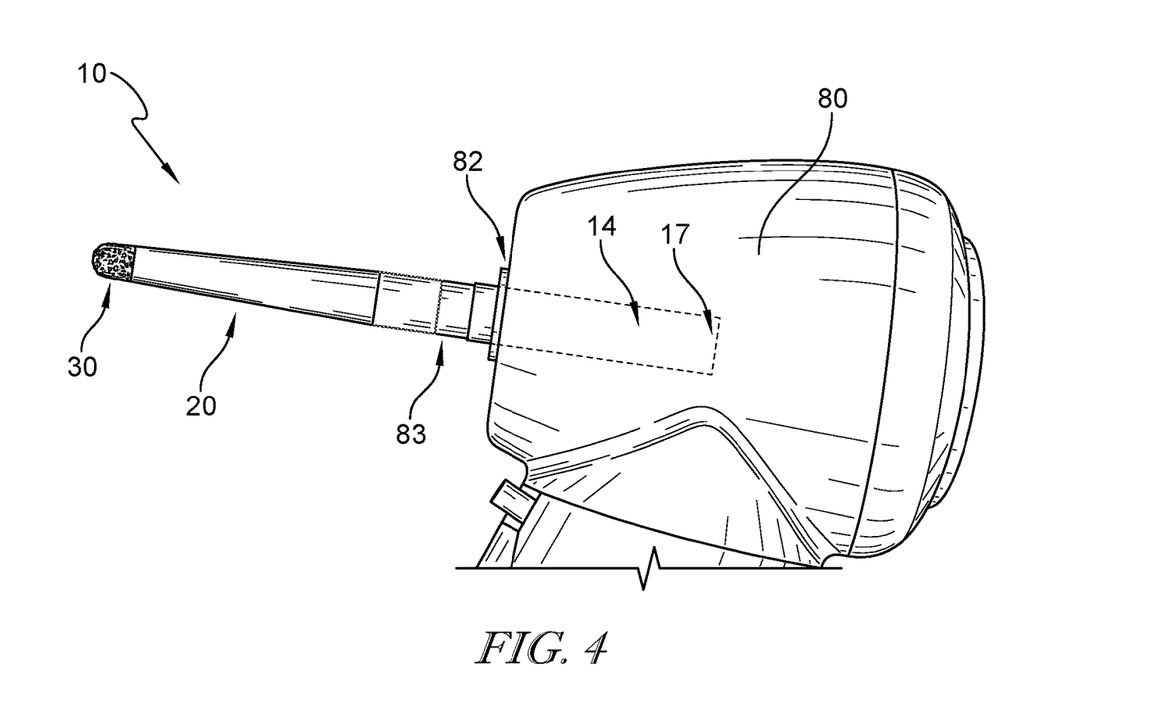
FIG. 4 is a side view of the dental bur as arranged within the dental tool of FIGS. 1 and 2, showing the dental bur attached to the dental drill.
Figure 5:
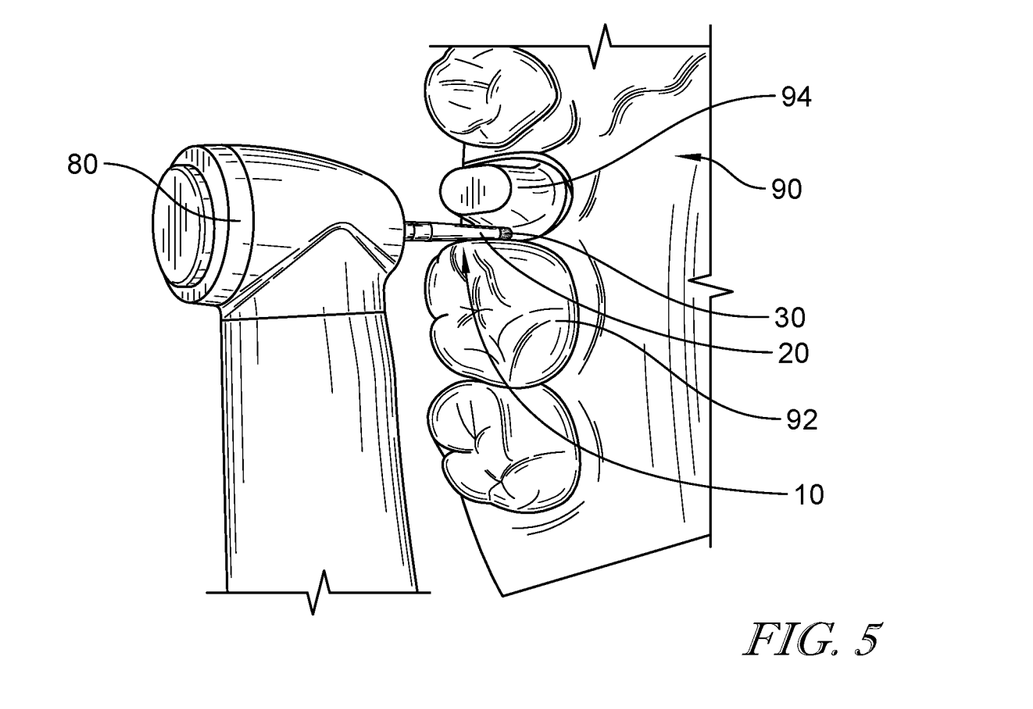
FIG. 5 is a perspective view of the dental bur as arranged within the dental tool of FIGS. 1 and 2, showing an additional view of the dental bur inserted into a lower area of a space between two adjacent teeth in order to precisely remove tooth material.
Figure 6:
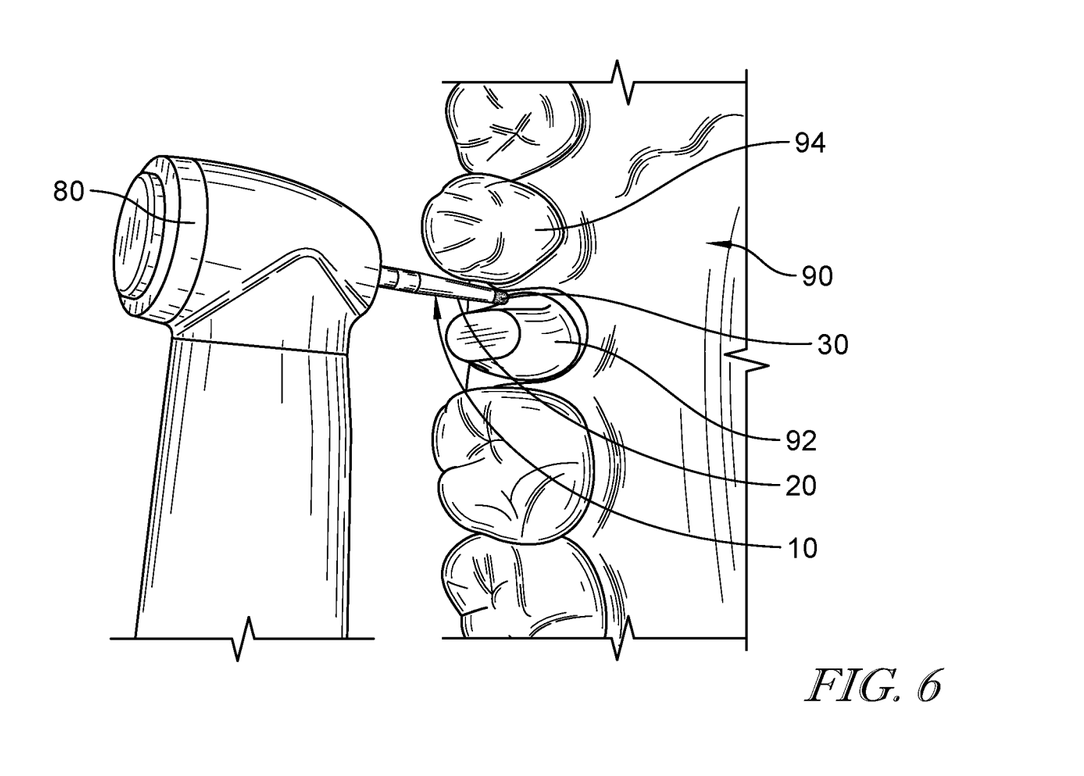
FIG. 6 is a perspective view similar to FIG. 5 of the dental bur as arranged within the dental tool of FIGS. 1 and 2, showing an additional view of the dental bur inserted into a lower area of a space between two adjacent teeth in order to precisely remove tooth material.
Figure 7:
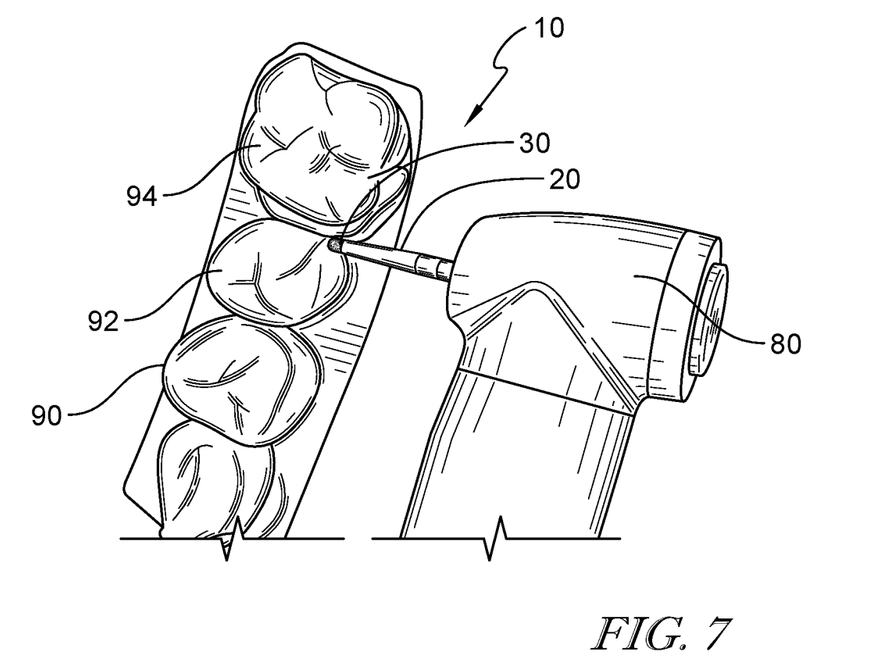
FIG. 7 is a side view of the dental bur as arranged within the dental tool of FIGS. 1 and 2, showing an additional view of the dental bur inserted from the side of the teeth into a lower area of a space between two adjacent teeth in order to precisely remove tooth material.

The shank 12 includes a first terminal end 17 and a second terminal end 18 located opposite the first terminal end 17 in a longitudinal direction of the shank 12, as shown in FIG. 1. The shank 12 includes the attachment section 14 located adjacent the first terminal end 17 and a guide section 20 located between the attachment section 14 and the second terminal end 18 as can be seen in FIG. 1. The attachment section 14 of the shank 12 may include a constant diameter 15 along the longitudinal extent of the attachment section 14 from the first terminal end 17 to the guide section 20 in some embodiments such that the attachment section 14 may be selectively inserted a desired distance into a bur mount 82 located in a head 84 of the dental drill 80. In some embodiments, the diameter 15 of the attachment section 14 is in the range of 2.0 mm to 3.0 mm, although other diameters greater or less than these values may be utilized based on the requirements of the teeth being modified by the bur 10 and the requirements of the drill 80. In other embodiments, as shown in FIGS. 1 and 4, the end of the attachment section 14 of the shank 12 has a taper 13 as the end that extends into the guide section 20.

The guide section 20 is located between the attachment section 14 and the second terminal end 18 of the shank 12, as shown in FIG. 1. The guide section 20 and the attachment section 14 may be formed of metallic materials. For example, the guide section 20 and attachment 14 may be formed zirconia, zirconia metal-oxide, zirconium, and the like. The guide section 20 includes at least one portion having a first width measured in a transverse direction of the shank and a second portion having a second width measured in the transverse direction, the first width being different than the second width.

For example, in the illustrative embodiment, the guide section 20 includes an inner end 21 located adjacent the attachment section 14 and an outer end 22 located adjacent the head 30, as shown in FIG. 1. The at least one portion having the first width 36 is located at the inner end 21 of the guide section 20 and the second portion having the second width 37 is located at the outer end 22 of the guide section 20, the first width 36 being greater than the second width 37. As a result, the guide section 20 in some embodiments has a constant first taper from the at least one portion having the first width 36 to the second portion having the second width 37 so as to form a frustum-shape. The width 38 at a midpoint of the guide section 20 is halfway between the first width 36 and the second width 37. In some embodiments, the diameter 15 of the attachment portion 14 of the shank 12 is equal to the first width 36. This shape of the guide section 20 allows for precision application of the head to a tooth for minimal and precise tooth material removal without the guide section removing tooth material when coming into contact with adjacent teeth.

The head 30 is arranged on the second terminal end 18 of the shank 12 and includes a tip 32 located opposite the shank 12, as shown in FIGS. 1-8. The tip 32 includes at least one rounded portion configured to remove portions of the tooth. For example, as shown in FIG. 1 and as shown in greater detail in FIG. 3, the at least one rounded portion of the tip 32 is a semi-spherical shape. In the illustrative embodiment, the semi-spherical shape of the tip 32 has a constant radius of curvature around the entire tip 32. In other embodiments, the semi-spherical shape of the tip 32 may be nonconstant such that the tip includes small grooves and bumps around the tip 32.

In the illustrative embodiment, the head 30 is entirely coated in an abrasive diamond material 35, as shown in FIGS. 1 and 3. The abrasive diamond material 35 may be adhered to the surface of the head 30. The diamond material 35 is extremely hard and, when the bur 10 is rotated at high speeds via the dental drill 80, is able to grind down the tooth tissue which typically consists of enamel, dentin, cementum, and restorative materials. The diamonds of the abrasive diamond material 35 may be in the range from ultra-fine to very coarse.

The head 30 also includes an inner terminal end 33 located adjacent the second terminal end 18 of the shank 12 and a main body portion 34 located between the inner terminal end 33 and the tip 32, as shown in FIG. 3. In the illustrative embodiment, the inner terminal end 33 has a third width 39 that is equal to the second width 37 of the second portion of the guide section 20 of the shank 12. An inner end 41 of the tip 32 located adjacent the main body portion 34 of the head 30 has a fourth width 43 that is less than the third width 39. Specifically, in some embodiments, the main body portion 34 of the head has a constant second taper from the inner terminal end 33 having the third width 39 to the inner end 41 of the tip 32 having the fourth width 43 so as to form a frustum-shape.

A taper angle of the second taper is equal to a taper angle of the first taper of the guide section 20 of the shank 12 such that the shank 12 and the main body portion 34 of the head 30 have a constant taper from the inner end 21 of the guide section 20 to the inner end 41 of the tip 32, as can be seen in FIGS. 1 and 8. In some embodiments, the width of the tip 32 at the inner end 41 is about 1.5 mm. The length of the head 30, from inner terminal end 33 to the outermost end of the tip 32 is about 2.0 mm in some embodiments. In other embodiments, the width of the tip 32 may be in the range of 1.0 mm to 2.0 mm, and the length may be in the range of 1.5 mm to 3.0 mm. These ranges may be adjusted based on the needs of the dental procedure and the teeth being modified.

In the illustrative embodiment, the guide section 20 of the shank 12 and the main body portion 34 of the head 30 are generally cylindrical such that the first width 36, the second width 37, the third width 39, and fourth width 43 are diameters of the generally cylindrical shank 12 and head 30.

Exemplary embodiments of the dental bur 10 in operation are shown in FIGS. 2 and 5-7. The dental bur 10 may be inserted into an area 90 of the patient's mouth for grinding down of tooth material minimally and precisely for the purposes of inserting a crown, veneers, or other similar procedure. Typically, before the crown or veneer is inserted and placed over the tooth, a portion of the outer surface of the tooth, usually the enamel, is grinded down to create an even, consistent surface against which to adhere the crown or veneer. As can be seen in FIG. 2, the dental bur 10 may be inserted into a lower area of a tooth or between adjacent teeth 92, 94 in order to begin removal of tooth material of one of the teeth 92, 94 or both teeth 92, 94. Because the only portion of the dental bur 10 that includes coarse, abrasive material capable of removing tooth material is the head 30, the shank 12 can come into contact with upper portions of the teeth 92, 94 without removing tooth material. This is useful in situations where removal of tooth material is required in difficult to reach areas and accidental removal of tooth material is undesired in areas where the shank 12 may bump or accidentally contact the tooth or adjacent teeth.

Another embodiment of a dental bur 110 in accordance with the present disclosure is shown in FIGS. 9 and 10. The dental bur 110 is similar to the dental bur 10 shown in FIGS. 1-8 and described herein. Accordingly, similar reference numbers in the 100 series indicate features that are common between the dental bur 110 and the dental bur 10. The description of the dental bur 10 is incorporated by reference to apply to the dental bur 110, except in instances when it conflicts with the specific description and the drawings of the dental bur 110.

Similar to the dental bur 10, the dental bur 110 of the present embodiment includes a shank 112 and a head 130, as shown in FIGS. 9 and 10. The shank 112 includes an attachment section 114 that is configured to be arranged within the bur mount 82 of the dental drill 80, and a guide section 120 located between the attachment section 114 and a second terminal end 118 of the shank 112. The guide section 120 includes at least one portion having a first width measured in a transverse direction of the shank and a second portion having a second width measured in the transverse direction, the first width being different than the second width.

For example, in the illustrative embodiment, the guide section 120 includes an inner end 121 located adjacent the attachment section 114 and an outer end 122 located adjacent the head 130, as shown in FIG. 9. The at least one portion having the first width 136 is located at the inner end 121 of the guide section 120 and the second portion having the second width 137 is located at the outer end 122 of the guide section 120. The first width 136 is greater than the second width 137 such that the guide section 120 in some embodiments has a constant first taper from the at least one portion having the first width 136 to the second portion having the second width 137 so as to form a frustum-shape. The width 138 at a midpoint of the guide section 120 is halfway between the first width 136 and the second width 137. In some embodiments, the first width 136 of the inner end 121 is equal to the diameter of the attachment section 114. This shape of the guide section 120 allows for precision application of the head to a tooth for minimal and precise tooth material removal without the guide section removing tooth material when coming into contact with adjacent teeth.

The head 130 is arranged on the second terminal end 118 of the shank 112 and includes a tip 132 located opposite the shank 112, as shown in FIGS. 9 and 10. The tip 132 includes at least one rounded portion configured to remove portions of the tooth. For example, as shown in FIG. 9 and as shown in greater detail in FIG. 10, the at least one rounded portion of the tip 132 is an annular rounded ridge 131 that extends around the tip 132 at the inner end 141 of the tip 132. A distal end 145 of the tip 132 located opposite the inner end 141 of the tip 132 is an annular flat surface 147 connected to the annular rounded ridge 131 so as to form a rounded chamfered shape. This chamfered shape, having the flat top surface and rounded edges may also be configured as a modified shoulder. In the illustrative embodiment, the head 130 is entirely coated in an abrasive diamond material 135, as shown in FIGS. 1 and 3. The abrasive diamond material 135 may be adhered to the surface of the head 130. The diamonds of the abrasive diamond material 135 may be in the range from ultra-fine to very coarse.

The head 130 also includes an inner terminal end 133 located adjacent the second terminal end 118 of the shank 112 and a main body portion 134 located between the inner terminal end 133 and the tip 132, as shown in FIG. 10. In the illustrative embodiment, the inner terminal end 133 has a third width 139 that is equal to the second width 137 of the second portion of the guide section 120 of the shank 112. The inner end 141 of the tip 132 is located adjacent the main body portion 134 of the head 130 and has a fourth width 143 that is less than the third width 139. Specifically, in some embodiments, the main body portion 134 of the head has a constant second taper from the inner terminal end 133 having the third width 139 to the inner end 141 of the tip 132 having the fourth width 143 so as to form a frustum-shape.

A taper angle of the second taper is equal to a taper angle of the first taper of the guide section 120 of the shank 112 such that the shank 112 and the main body portion 134 of the head 130 have a constant taper from the inner end 121 of the guide section 120 to the inner end 141 of the tip 132, as can be seen in FIGS. 9 and 10. In some embodiments, the width of the tip 132 at the inner end 141 is about 1.5 mm. The length of the head 130, from inner terminal end 133 to the distal end 145 of the tip 132 is about 2.0 mm in some embodiments. In other embodiments, the width of the tip 132 may be in the range of 1.0 mm to 2.0 mm, and the length may be in the range of 1.5 mm to 3.0 mm. These ranges may be adjusted based on the needs of the dental procedure and the teeth being modified.

Another embodiment of a dental bur 210 in accordance with the present disclosure is shown in FIG. 11. The dental bur 210 is similar to the dental burs 10, 110 shown in FIGS. 1-10 and described herein. Accordingly, similar reference numbers in the 200 series indicate features that are common between the dental bur 210 and the dental burs 10, 110. The descriptions of the dental burs 10, 110 are incorporated by reference to apply to the dental bur 210, except in instances when they conflict with the specific description and the drawings of the dental bur 210.

Similar to the dental burs 10, 110, the dental bur 210 of the present embodiment includes a shank 212 and a head 230, as shown in FIG. 11. The shank 212 includes an attachment section 214 that is configured to be arranged within the bur mount 82 of the dental drill 80, and a guide section 220 located between the attachment section 214 and a second terminal end 218 of the shank 212.

In the illustrative embodiment, the guide section 220 includes an inner end 221 located adjacent the attachment section 214 and an outer end 222 located adjacent the head 230, and an intermediate section 224 located longitudinally between the inner end 221 and the outer end 222, as shown in FIG. 11. The at least one portion having the first width 236 is located at the inner end 221 of the guide section 220 and the second portion having the second width 237 is located at the outer end 222 of the guide section 220. A third portion of the guide section is located between the at least one portion and the second portion within the intermediate section 224 and has a third width 238 measured in the transverse direction. The first width 236 and the second width 237 are greater than the third width 238 such that the guide section 220 has an hourglass shape. In the illustrative embodiment, the second width 237 is smaller than the first width 236, as shown in FIG. 11. This shape of the guide section 220 allows for precision application of the head to a tooth for minimal and precise tooth material removal without the guide section removing tooth material when coming into contact with adjacent teeth. In some embodiments, the first width 236 of the inner end 221 is equal to the diameter of the attachment section 214.

The head 230 is arranged on the second terminal end 218 of the shank 212 and includes a tip 232 located opposite the shank 212, as shown in FIG. 11. The tip 232 includes at least one rounded portion configured to remove portions of the tooth. For example, as shown in FIG. 11, the at least one rounded portion of the tip 232 is an annular rounded ridge 231 that extends around the tip 232 at the inner end 241 of the tip 232. A distal end 245 of the tip 232 located opposite the inner end 241 of the tip 232 is an annular flat surface 247 connected to the annular rounded ridge 231 so as to form a rounded chamfered shape. This chamfered shape, having the flat top surface and rounded edges may also be configured as a modified shoulder. In other embodiments, the at least one rounded portion of the tip 232 may be formed as a semi-spherical shape having a constant or non-constant radius of curvature, as shown in FIGS. 1-8. In the illustrative embodiment, the head 230 is entirely coated in an abrasive diamond material 235. The abrasive diamond material 235 may be adhered to the surface of the head 230. The diamonds of the abrasive diamond material 235 may be in the range from ultra-fine to very coarse.

The head 230 also includes an inner terminal end 233 located adjacent the second terminal end 218 of the shank 212 and a main body portion 234 located between the inner terminal end 233 and the tip 232, as shown in FIG. 11. In the illustrative embodiment, the inner terminal end 233 has a third width 239 that is equal to the second width 237 of the second portion of the guide section 220 of the shank 212. The inner end 241 of the tip 232 is located adjacent the main body portion 234 of the head 230 and has a fourth width 243 that is less than the third width 239. In some embodiments, the width of the tip 232 at the inner end 241 is about 1.5 mm. The length of the head 230, from inner terminal end 233 to the distal end 245 of the tip 232 is about 2.0 mm in some embodiments. In other embodiments, the width of the tip 232 may be in the range of 1.0 mm to 2.0 mm, and the length may be in the range of 1.5 mm to 3.0 mm. These ranges may be adjusted based on the needs of the dental procedure and the teeth being modified.

Another embodiment of a dental bur 310 in accordance with the present disclosure is shown in FIG. 12. The dental bur 310 is similar to the dental burs 10, 110, 210 shown in FIGS. 1-11 and described herein. Accordingly, similar reference numbers in the 300 series indicate features that are common between the dental bur 310 and the dental burs 10, 110, 210. The descriptions of the dental burs 10, 110, 210 are incorporated by reference to apply to the dental bur 310, except in instances when they conflict with the specific description and the drawings of the dental bur 310.

Similar to the dental burs 10, 110, 210, the dental bur 310 of the present embodiment includes a shank 312 and a head 330, as shown in FIG. 12. The shank 312 includes an attachment section 314 that is configured to be arranged within the bur mount 82 of the dental drill 80, and a guide section 320 located between the attachment section 314 and a second terminal end 318 of the shank 312.

In the illustrative embodiment, the guide section 320 includes an inner end 321 located adjacent the attachment section 314 and an outer end 322 located adjacent the head 330, and an intermediate section 324 located longitudinally between the inner end 321 and the outer end 322, as shown in FIG. 12. The at least one portion having the first width 336 is located at the inner end 321 of the guide section 320 and the second portion having the second width 337 is located at the outer end 322 of the guide section 320. A third portion of the guide section is located between the at least one portion and the second portion within the intermediate section 324 and has a third width 338 measured in the transverse direction. The first width 336, the second width 337, and the third width 338 have an equal diameter such that the guide section 320 has a straight, cylindrical shape. This shape of the guide section 320 allows for precision application of the head to a tooth for minimal and precise tooth material removal without the guide section removing tooth material when coming into contact with adjacent teeth. In some embodiments, the first width 336 of the inner end 321 is equal to the diameter of the attachment section 314.

The head 330 is arranged on the second terminal end 318 of the shank 312 and includes a tip 332 located opposite the shank 312, as shown in FIG. 12. The tip 332 includes at least one rounded portion configured to remove portions of the tooth. For example, as shown in FIG. 12, the at least one rounded portion of the tip 332 is an annular rounded ridge 331 that extends around the tip 332 at the inner end 341 of the tip 332. A distal end 345 of the tip 332 located opposite the inner end 341 of the tip 332 is an annular flat surface 347 connected to the annular rounded ridge 231 so as to form a rounded chamfered shape. This chamfered shape, having the flat top surface and rounded edges may also be configured as a modified shoulder. In other embodiments, the at least one rounded portion of the tip 332 may be formed as a semi-spherical shape having a constant or non-constant radius of curvature, as shown in FIGS. 1-8. In the illustrative embodiment, the head 330 is entirely coated in an abrasive diamond material 335. The abrasive diamond material 335 may be adhered to the surface of the head 330. The diamonds of the abrasive diamond material 335 may be in the range from ultra-fine to very coarse.

The head 330 also includes an inner terminal end 333 located adjacent the second terminal end 318 of the shank 312 and a main body portion 334 located between the inner terminal end 333 and the tip 332, as shown in FIG. 12. In the illustrative embodiment, the inner terminal end 333 has a third width 339 that is equal to the second width 337 of the second portion of the guide section 320 of the shank 312. The inner end 341 of the tip 332 is located adjacent the main body portion 334 of the head 330 and has a fourth width 343 that is less than the third width 339. In some embodiments, the width of the tip 332 at the inner end 341 is about 1.5 mm. The length of the head 330, from inner terminal end 333 to the distal end 345 of the tip 332 is about 2.0 mm in some embodiments. In other embodiments, the width of the tip 332 may be in the range of 1.0 mm to 2.0 mm, and the length may be in the range of 1.5 mm to 3.0 mm. These ranges may be adjusted based on the needs of the dental procedure and the teeth being modified.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A dental bur for removing precise portions of a tooth, comprising:
a shank having a first terminal end, a second terminal end located opposite the first terminal end in a longitudinal direction of the shank, an attachment section located adjacent the first terminal end, and a guide section located between the attachment section and the second terminal end, the attachment section being configured to be inserted into and rotationally driven by a high-speed rotary device, the guide section including at least one portion having a first portion having a first width measured in a transverse direction of the shank and a second portion having a second width measured in the transverse direction, and the first width being different than the second width; and
a head arranged on the second terminal end of the shank and including a main body portion arranged on the second terminal end of the shank and a tip located on an outer terminal end of the main body portion and opposite the shank, the tip having at least one rounded portion configured to remove portions of the tooth, and the head being entirely coated in an abrasive diamond material,
wherein the main body portion is cylindrical and continuously tapered from an inner terminal end of the main body portion to the tip, the main body portion tapering from a larger width to a smaller width in a direction from the shank to the tip,
wherein the at least one rounded portion of the tip has a semi-spherical shape,
wherein the guide section is devoid of abrasive diamond material and devoid of an abrasive coating,
wherein the guide section includes an inner end located adjacent the attachment section, an outer end located adjacent the head, and an intermediate section located between the inner end and the outer end, the first portion having the first width is located at the inner end of the guide section, the second portion having the second width is located at the outer end of the guide section, a third portion of the guide section is located between the first portion and the second portion within the intermediate section and has a third width measured in the transverse direction, and the first width and the second width are greater than the third width such that the guide section has an hourglass shape,
wherein the third width is the smallest width along a longitudinal length of the guide section, and
wherein a first lengthwise location that is located generally centrally along the longitudinal length of the guide section has the third width.

2. The dental bur of claim 1, wherein the first width is greater than the second width.

3. The dental bur of claim 2, wherein the inner terminal end of the main body portion has a fourth width that is equal to the second width of the shank at the second terminal end of the shank.

4. The dental bur of claim 3, wherein an inner end of the tip located adjacent the main body portion of the head has a fifth width that is less than the fourth width.

5. The dental bur of claim 4, wherein the guide section of the shank and the main body portion of the head define cross sections at each of the first, second, third, fourth, and fifth widths that are generally circular such that the first, second, third, fourth, and fifth widths are diameters of the shank and head.

6. A high-speed dental drill, comprising:
a drill head;
a bur mount arranged within the drill head and configured to rotate at high speeds;
a motor for rotating the bur mount;
a dental bur arranged within the bur mount, the dental bur including:
a shank having a first terminal end, a second terminal end located opposite the first terminal end in a longitudinal direction of the shank, an attachment section located adjacent the first terminal end, and a guide section located between the attachment section and the second terminal end, the attachment section being configured to be inserted into and rotationally driven by a high-speed rotary device, the guide section including at least one portion having a first portion having a first width measured in a transverse direction of the shank and a second portion having a second width measured in the transverse direction, and the first width being different than the second width; and
a head arranged on the second terminal end of the shank and including a tip located opposite the shank, the tip having at least one rounded portion configured to remove portions of the tooth, and the head being entirely coated in an abrasive diamond material,
wherein the head includes a main body portion extending between an inner terminal end located adjacent the second terminal end of the shank and an outer terminal end located adjacent the tip,
wherein the inner terminal end has a third width measured in a transverse direction of the head and the second terminal end of the shank has a fourth width,
wherein the third width is equal to the fourth width of the second terminal end of the shank,
wherein a width of the main body portion of the head at every position between the inner terminal end and the outer terminal end is less than or equal to the third and fourth widths and is greater than or equal to a width of the tip at every position between an inner end of the tip adjacent the main body portion and a distal end of the tip, and
wherein the guide section is devoid of abrasive diamond material and devoid of an abrasive coating,
wherein the guide section includes an inner end located adjacent the attachment section and an outer end located adjacent the head, the first portion having the first width is located at the inner end of the guide section, the second portion having the second width is located at the outer end of the guide section, and the first width is greater than the second width,
wherein the guide section has a constant first taper from the first portion having the first width to the second portion having the second width so as to form a frustum-shape,
wherein the at least one rounded portion of the tip has a semi-spherical shape,
wherein the inner end of the tip located adjacent the main body portion of the head has a fifth width that is less than the third and fourth widths, and
wherein the main body portion of the head has a constant second taper from the inner terminal end having the third width to the inner end of the tip having the fifth width so as to form a frustum-shape, and a taper angle of the second taper is equal to a taper angle of the constant first taper of the guide section of the shank.

7. A high-speed dental drill, comprising:
a drill head;
a bur mount arranged within the drill head and configured to rotate at high speeds;
a motor for rotating the bur mount;
a dental bur arranged within the bur mount, the dental bur including:
- a shank having a first terminal end, a second terminal end located opposite the first terminal end in a longitudinal direction of the shank, an attachment section located adjacent the first terminal end, and a guide section located between the attachment section and the second terminal end, the attachment section being configured to be inserted into and rotationally driven by a high-speed rotary device, the guide section including at least one portion having a first portion having a first width measured in a transverse direction of the shank and a second portion having a second width measured in the transverse direction, and the first width being different than the second width; and
- a head arranged on the second terminal end of the shank and including a tip located opposite the shank, the tip having at least one rounded portion configured to remove portions of the tooth, and the head being entirely coated in an abrasive diamond material, wherein the head includes a main body portion extending between an inner terminal end located adjacent the second terminal end of the shank and an outer terminal end located adjacent the tip, wherein the inner terminal end has a third width measured in a transverse direction of the head and the second terminal end of the shank has a fourth width, wherein the third width is equal to the fourth width of the second terminal end of the shank, wherein a width of the main body portion of the head at every position between the inner terminal end and the outer terminal end is less than or equal to the third and fourth widths and is greater than or equal to a width of the tip at every position between an inner end of the tip adjacent the main body portion and a distal end of the tip, wherein the guide section includes a constant first taper between the attachment section and the second terminal end, the guide section being devoid of abrasive diamond material and devoid of an abrasive coating, and wherein the main body portion of the head has a constant second taper from the inner terminal end having the third width to the inner end of the tip so as to form a frustum-shape, and a taper angle of the second taper is equal to a taper angle of the first taper of the guide section of the shank.

8. The high-speed dental drill of claim 7, wherein the guide section includes an inner end located adjacent the attachment section and an outer end located adjacent the head, the first portion having the first width is located at the inner end of the guide section, the second portion having the second width is located at the outer end of the guide section, and the first width is greater than the second width.

9. The high-speed dental drill of claim 8, wherein the constant first taper of the guide section extends from the first portion having the first width to the second portion having the second width so as to form a frustum-shape.

10. The high-speed dental drill of claim 9, wherein the at least one rounded portion of the tip has a semi-spherical shape.

11. The high-speed dental drill of claim 9, wherein the at least one rounded portion of the tip is an annular rounded ridge that extends around the tip at the inner end of the tip, and wherein the distal end of the tip located opposite the inner end of the tip is an annular flat surface connected to the annular rounded ridge.

* * * * *